United States Patent
Schneider et al.

(10) Patent No.: US 6,530,747 B1
(45) Date of Patent: Mar. 11, 2003

(54) BALANCING CLIP

(75) Inventors: Ralf-Michael Schneider, Rheinmuenster (DE); Martin Huber, Oberkirch (DE); Cornelia Lula, Offenburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/889,131

(22) PCT Filed: Nov. 14, 2000

(86) PCT No.: PCT/DE00/04024

§ 371 (c)(1), (2), (4) Date: Jul. 12, 2001

(87) PCT Pub. No.: WO01/38753

PCT Pub. Date: May 31, 2001

(30) Foreign Application Priority Data

Nov. 26, 1999  (DE) .......................... 199 57 030

(51) Int. Cl.[7] .............................................. F04D 29/66
(52) U.S. Cl. ...................... 416/144; 416/500; 415/119; 74/573 R; 24/350
(58) Field of Search ................. 416/144, 145, 416/500; 415/119; 74/573 R; 24/350, 355, 295

(56) References Cited

U.S. PATENT DOCUMENTS

| | | | | |
|---|---|---|---|---|
| 2,817,132 A | * | 12/1957 | Petri ........................... | 24/295 |
| 3,208,119 A | * | 9/1965 | Seckerson .................... | 24/295 |
| 3,315,750 A | * | 4/1967 | Delaney ...................... | 416/144 |
| 3,512,222 A | * | 5/1970 | Tinnerman ................... | 24/350 |
| 3,869,760 A | | 3/1975 | Meyer | |
| 4,025,231 A | * | 5/1977 | Kochevar et al. ........... | 416/144 |
| 5,470,203 A | | 11/1995 | Mori | |
| 5,634,314 A | | 6/1997 | Champagne | |
| 5,759,004 A | * | 6/1998 | Kuffel .......................... | 24/295 |

FOREIGN PATENT DOCUMENTS

| | | | | |
|---|---|---|---|---|
| DE | 1205341 A | * | 11/1965 | ................... 24/295 |
| DE | 91 02 865 U | | 7/1992 | |
| FR | 2 702 521 A | | 9/1994 | |

* cited by examiner

Primary Examiner—Christopher Verdier
(74) Attorney, Agent, or Firm—Michael J. Striker

(57) ABSTRACT

A clamp (20, 50) for balancing can be mounted on the circumference of a rotating body (10) on a part (12) that tapers to a thin-walled end. The clamps (20, 50) has a U-shaped cross-sectional profile with at least one tip (28, 30) formed onto one leg (24, 26), which tip protrudes into the interior (36) of the U-shaped cross-sectional profile and extends in inclined fashion toward the connecting part (32) of the legs (24, 26).

9 Claims, 4 Drawing Sheets

BALANCING CLIP

BACKGROUND OF THE INVENTION

The invention is based on a clamp for balancing.

In rotating bodies, the centrifugal forces relative to the axis of rotation balance one another out, if the masses of the rotating body are balanced. Unbalanced masses, resulting for instance from production variations, engender revolving, radially acting centrifugal forces that cyclically put a load on the bearing in alternating directions. Since because of the elasticity of the material and the intrinsic mass, each component is a spring-mass system capable of vibration, it can be induced to vibrate by cyclical forces; excitations in the range of the natural frequency can be especially problematic and can lead to permanent damage to the bearings and other components. For this reason, especially in bodies that rotate at high speed, such as impellers of fans, imbalances that exist after assembly are ascertained and compensated for by balancing weights.

To compensate for an imbalance, in radial fans so-called balancing clamps are secured to the relatively thin impeller vanes. Various clamps are known, which are made from sheet spring steel or round wire and as a rule are inserted from outside onto the impeller vanes of the fan. The clamps are designed structurally such that they completely surround the impeller vanes or have insert detent zigzags with which they mesh in clawlike fashion. However, for installing the claws with insert detent zigzags, considerable force must be expended. Furthermore, the clamps can catch on one another. They then have to be separated into individual clamps before assembly, which is complicated, and can therefore be incorporated only poorly into an automatic process. Finally, there is the risk that many clamps, under the influence of external forces during operation, will change their position or become loose, so that imbalances that lead to problems arise once again. Then the component has to be balanced all over again.

SUMMARY OF THE INVENTION

According to the invention, a clamp for balancing an imbalance has a U-shaped cross-sectional profile with at least one tip formed onto a leg; the tip protrudes into the interior of the U-shaped cross-sectional profile and extends at an incline toward the connecting part of the legs. The clamp can be mounted axially or radially by being bent open elastically widely enough that the legs with the formed-on tip can be slipped over the body having the thin-walled part, such as an impeller vane. The prestressing of the clamp presses the tip against the impeller vane, and the tip digs into the surface of the impeller vane slightly. If forces such as centrifugal forces or impact forces act on the clamp outward, the legs of the clamp are increasingly spread apart by the tip, so that the contact pressure of the tip is, increased and its seat is solidified. Thus the clamp cannot be removed without a special tool, nor can it change its position, once assumed, unintentionally.

Expediently, a plurality of tips are disposed axially offset from one another on one leg and alternate with tips on the other leg. In the unmounted state, the tips of one leg are located in the interstices between the tips of the other leg, so that for a long spring path for the prestressing, the clamps require little space in the dismantled state. In the mounted state, the tips dig from both sides into the thin-walled component, that is, the impeller vane, and thus axially and radially reinforce the retention created by the prestressing.

On a body that is to be balanced, such as an impeller vane, the clamps can be mounted axially and/or radially, depending on the design of the body. They are mounted in such a way that the connecting part and thus also the tips point toward the outer circumference of the impeller vane. The centrifugal force increases the angle of inclination of the tips to the legs, and as a result the clamp is resiliently bent open and thus reinforces the contact pressure against the impeller vane. A correspondingly reinforced resistance is also presented to axially acting forces, by means of a triangular shape of the tips. The clamp is thus stably fixed in its position and can accordingly not be removed from the fan without aids. This is important for the further use until the system is completed, since a worn or displaced clamp would necessitate later work in the form of rebalancing.

To enable mounting the clamp well, the ratio between the retaining force and the slip-on force is modified by providing that the design of the tips and their inclination to the legs are adapted to installation conditions.

The shape of the clamp of the invention selected such that in the unmounted state, the tips protrude into the U-shaped interior and optionally dip into the respective opposed contour. Axial indentations are provided for this purpose in the associated legs. The indentations protrude vertically and horizontally past the tips, so that the tips are always covered by adjacent parts of the outer contour of the clamp. Advantageously, the peripheral region of a leg is bent outward, in order to cover a tip protruding through its indentation if applicable. This prevents loose clamps from catching on one another before being mounted. Moreover, they can easily be separated and are therefore especially well suited to automatic production processes. To enable automatic separation and alignment of the clamps in a simple way, it is expedient that the legs are of different lengths.

In a feature of the invention, the clamps have recesses. By means of the size, shape and position of the recesses or the contour of the clamps, many variants of similar clamps with different masses and mass distributions can be made. As a result, the clamps can be used for many applications, such as for fans of different sizes, and so forth.

BRIEF DESCRIPTION OF THE DRAWINGS

Further advantages will become apparent from the ensuing drawing description. Exemplary embodiments of the invention are shown in the drawing. The drawing, description and claims include numerous characteristics in combination. One skilled in the art will expediently consider the characteristics individually as well and put them together to make useful further combinations.

Shown are.

DETAILED DESCRIPTION OF THE PREFERRED EMBODIMENTS

Figure 1:
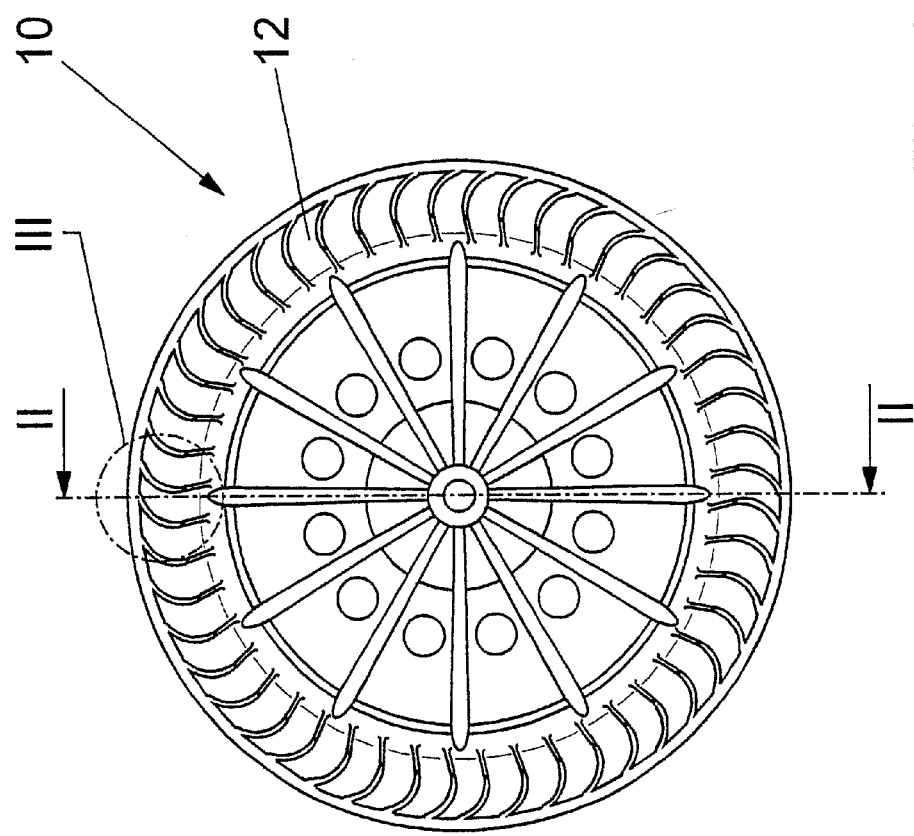
FIG. 1, a front view of a fan before balancing, in the direction of the arrow I in FIG. 2.
Figure 2:
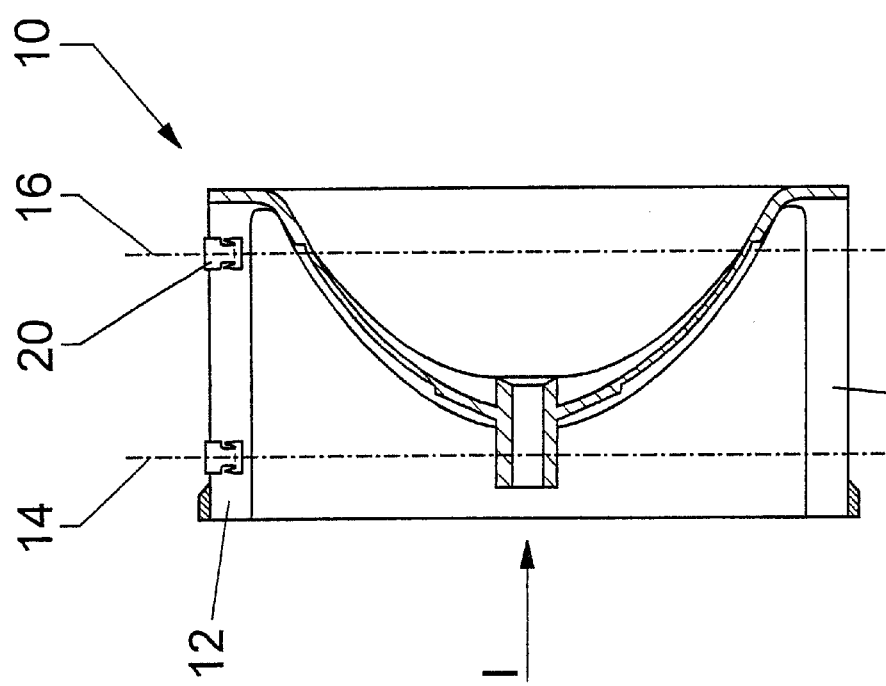
FIG. 2, a section taken along a line II—II in FIG. 1.

In FIG. 1, an impeller 10 of a fan is shown from the front, before balancing. On its circumference, it has many impeller vanes 12. In the balancing process, the imbalance of the impeller 10 is first measured in the planes 14 and 16. Next, depending on the measurement findings, at least one clamp 20 is mounted in the plane 14 and/or in the plane 16, in order thereby to achieve a mass equilibrium.

Figure 4:
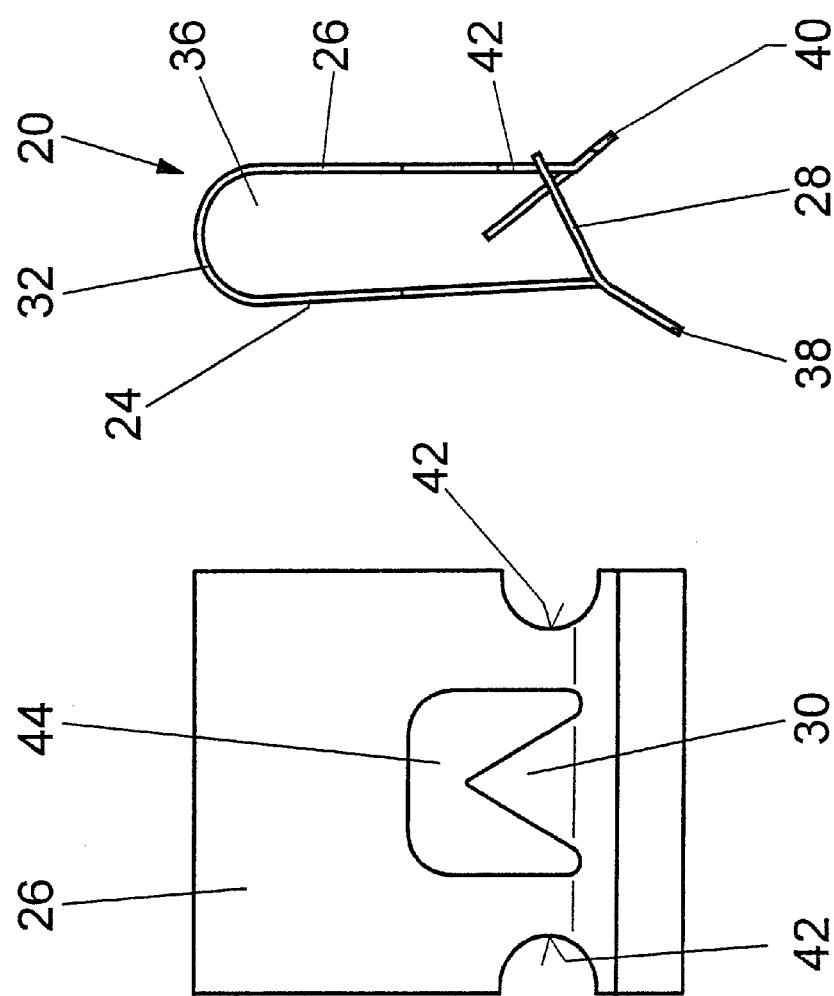
FIG. 4, a front view of a clamp of the invention.
Figure 5:
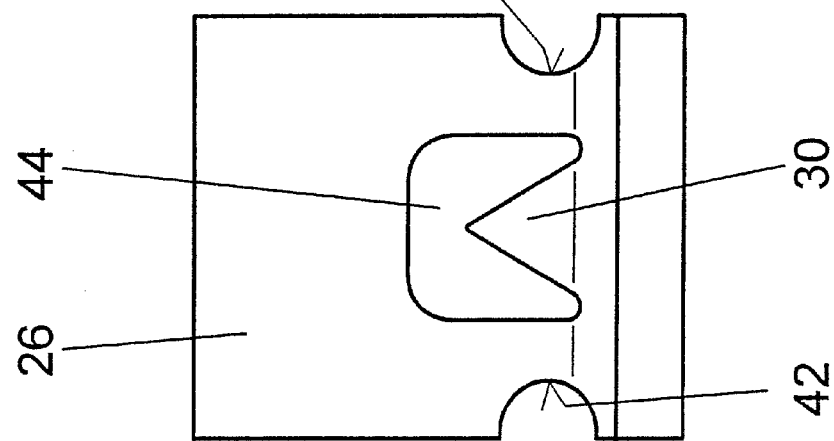
FIG. 5, a side view of one leg of the clamp of FIG. 4, seen from the right, with unbent tips.

The clamp 20 has a U-shaped cross-sectional profile with legs 24 and 26, which are joined together via a connecting part 32 and enclose a U-shaped interior 36 (FIG. 4). From the connecting part 32, the legs 24 and 26 extend slightly conically toward one another, and their peripheral regions 38 and 40, respectively, are bent outward. A tip 30 formed onto the leg 26 is bent into the U-shaped interior 36, specifically in such away that it points toward the opposed leg 24 and in the direction toward the connecting part 32. Two tips 28 formed onto the leg 24 are offset axially from one another and are also bent in the same way into the U-shaped interior 36. They dip into axial indentations 42 of the leg 26. In the unmounted state, the tips 28 protrude partway through the indentations 42, but in the outer region of the clamp 20 they are covered by the outward-bent peripheral region 40 of the leg 26. FIG. 5, which is a side view of the leg 26, shows the leg 26 with the tip 30 in the unbent state. The leg 26 can have a symmetrical shape and has the tip 30 in its middle. It is located in a recess 44 and takes the form of an isosceles triangle, one side of which is connected to the peripheral, region 40 of the leg 26. The indentations 42 are recessed in axially offset fashion and on both sides of the tip 30.

Figure 6:
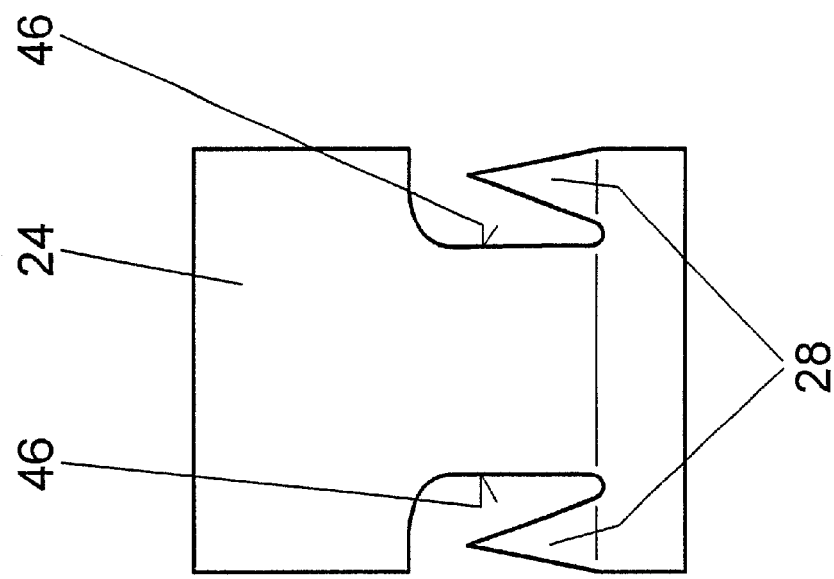
FIG. 6, a side view of one leg of the clamp of FIG. 4, seen from the left, with unbent tips.

Another side view of the clamp 20 shows the leg 24 with tips 28 in an unbent state (FIG. 6). The leg 24 has two laterally disposed tips 28. Relative to the tip 30, the tips 28 are axially offset toward the left and right edges of the clamp 20, so that the respective tips 28 and 30 on the opposed legs 24 and 26 alternate with one another and in the unmounted state partly overlap. The tips 28 are surrounded by indentations 46, which vertically and horizontally cover the tips 28.

Figure 9:
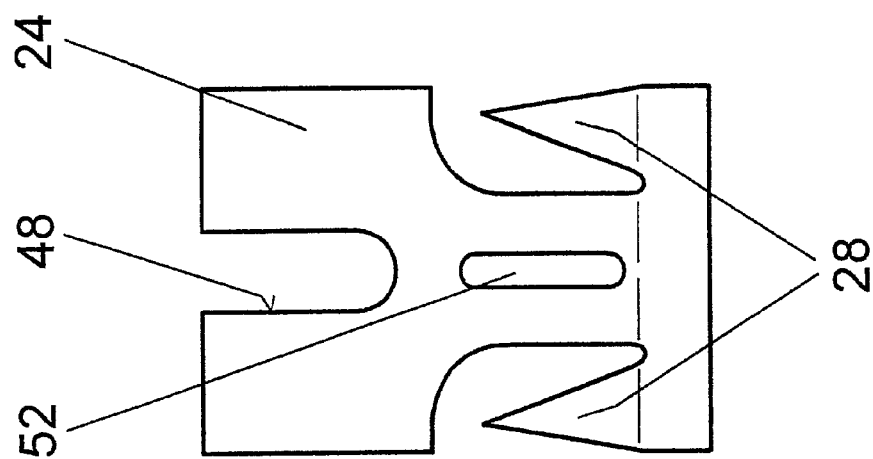
FIG. 9, a variant of FIG. 6.
Figure 7:
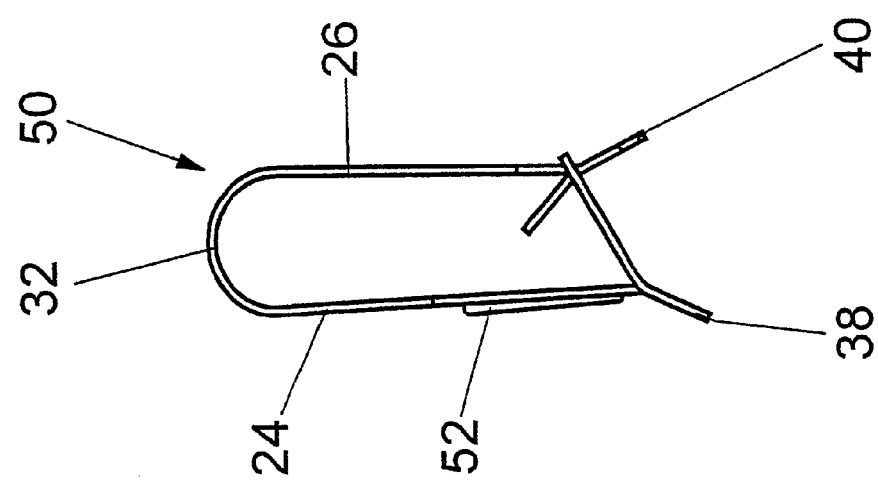
FIG. 7, a variant of FIG. 4.
Figure 8:
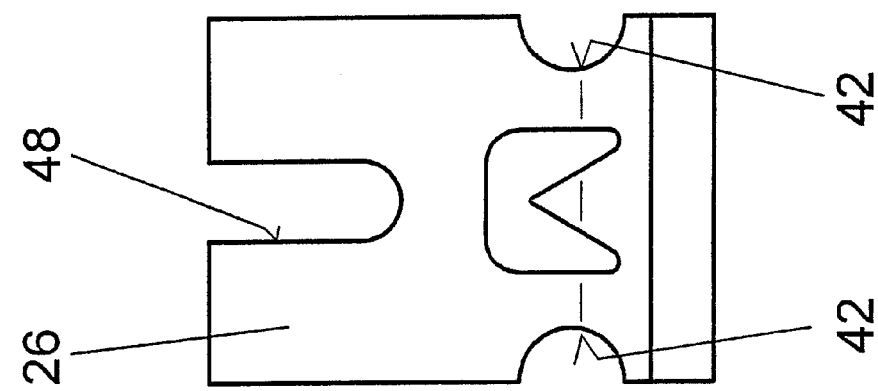
FIG. 8, a variant of FIG. 5.

The clamp 20 is expediently stamped from a resilient metal sheet and then bent, and the legs 24 and 26 have different lengths. The inward-bent tips 28 and 30 close the U-shaped interior 36 at the end of the legs 24 and 26. This creates a relatively closed contour of the clamp 20, which is highly important for the sake of automating the balancing process. FIG. 7 shows a variant of the invention in which a clamp 50 differs from the clamp 20 in having a different weight. The clamp 50 is smaller and for reinforcement purposes has a bead 52 on the leg 24. At the same time, it has a slitlike recess 48, which is disposed in the middle and extends from the leg 24 through the connecting part 32 to the other leg 26 (FIG. 8, FIG. 9).

Figure 3:
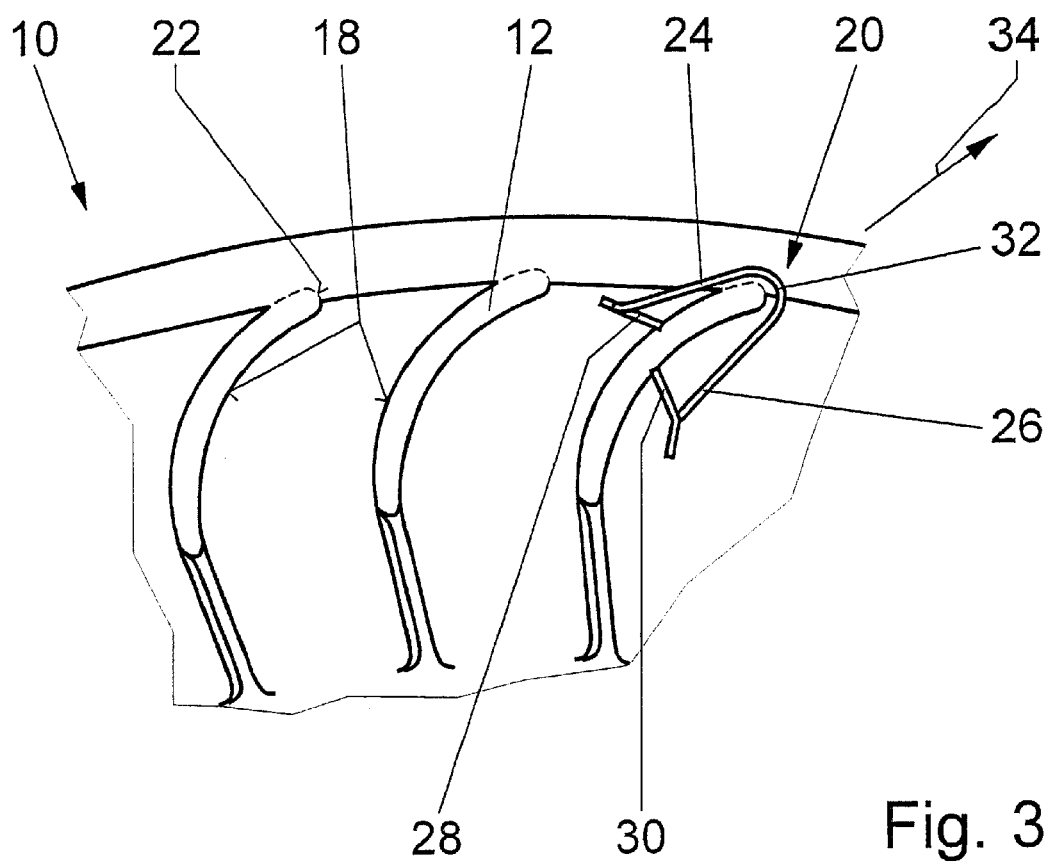
FIG. 3, an enlarged detail indicated by line III in FIG. 1, with a mounted clamp.

The thin-walled impeller vanes can have different bent shapes; they have large-area, wide deflection faces 18 and one narrow trailing face 22. From the narrow trailing face 22, the clamp 20 is moved in the axial direction via the impeller vane 12 to the level of the plane 14 and/or 16 (FIG. 3). To that end, the legs 24 and 26 are spread apart elastically far enough that they can easily be slipped axially or radially onto the impeller vane 12. The tips 28 and 30 formed onto these legs and bent inward press into the material comprising the impeller vane 12 in response to the spring force of the legs 24, 26 and of the connecting part 32. The spring force is determined by the material thickness and by the size of the clamp 20 as well as by the spring path that is required to slip the legs 24, 26 with the tips 28, 30 over the impeller vane 12. The tips 28 and 30 point in the direction of the connecting part 32, so that an outward-exerted centrifugal force component 34 spreads the tips 28, 30 apart to an increased degree and increases the contact pressure on the tips 28, 30, causing them to penetrate still deeper into the material of the impeller vane 12 and to stabilize the seat. The same is true for impact and shock forces that act in this direction.

LIST OF REFERENCE NUMERALS

10 Impeller
12 Impeller vane
14 Plane
16 Plane
18 Deflection face
20 Clamp
22 Trailing face
24 Leg
26 Leg
28 Tip
30 Tip
32 Connecting part
34 Centrifugal force component
36 Interior
38 Peripheral region
40 Peripheral region
42 Indentation
44 Recess
46 Indentation
48 Recess
50 Clamp
52 Bead

What is claimed is:

1. A clamp (20, 50) for balancing, which can be mounted on the circumference of a rotating body (10) on a part (12) that tapers to a thin-walled end and having a U-shaped cross-sectional profile with at least one tip (28, 30) formed onto each of two legs (24, 26) of said profile, wherein said at least one tip protrudes into the interior (36) of the U-shaped cross-sectional profile and extends in inclined fashion toward a connecting part (32) of the legs (24, 26), wherein said at least one tip on one leg (26) is arranged to be axially offset to the at least one tip of the other leg (24), and wherein, in an unmounted state, the at least one tip on the one leg (26) partially overlaps the at least one tip of the other leg (24).

2. The clamp (20, 50) of claim 1, wherein the at least one tip (28, 30), in the unmounted state, plunges into a respective opposed contour.

3. The clamp (20, 50) of claim 2, wherein the at least one tip (28, 30) is located on an axial indentation (46) or recess (44) of the associated leg (24).

4. The clamp (20, 50) of claim 3, wherein the at least one tip (28, 30) is covered by adjacent parts of the clamp (20, 50).

5. The clamp (20, 50) of claim 1, wherein the legs (24, 26) of the U-shaped cross-sectional profile are of different lengths.

6. The clamp (20, 50) of claim 5, wherein peripheral regions (38, 40) of the legs (24, 26) are bent outward.

7. The clamp (20, 50) of claim 1, wherein the clamp (20, 50) has at least one recess (48) for balancing of a weight of the clamp, wherein said at least one recess (48) extends from one leg (24) through the connecting part (32) to the other leg (26).

8. The clamp (20, 50) of claim 1, wherein on one leg (24, 26) at least two axially offset tips (28, 30) are disposed, and wherein one of the at least one tip (28, 30) of the other leg (24, 26) engages in an intermediate space between the at least two axially offset tips.

9. The clamp (20, 50) of claim 3, wherein one leg (24) has a bead (52) disposed between two of said at least one tip (28, 30) for reinforcement purposes.

* * * * *